Sept. 9, 1969  K. V. CUSHMAN ETAL  3,465,637
FASTENER
Filed Sept. 26, 1967  2 Sheets-Sheet 1
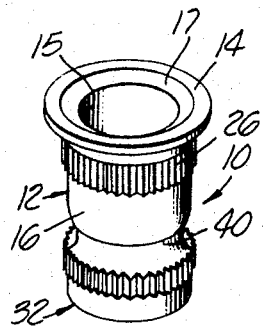
FIG. 1.
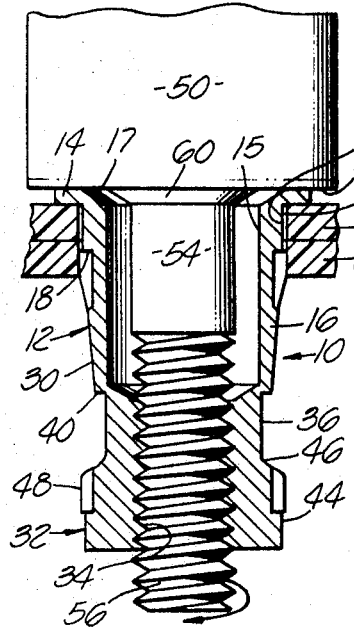
FIG. 2.
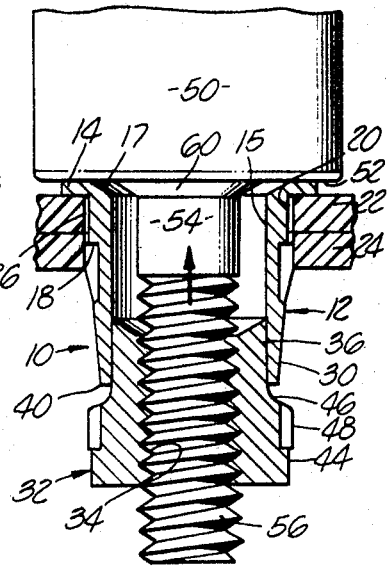
FIG. 3.
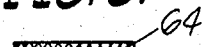
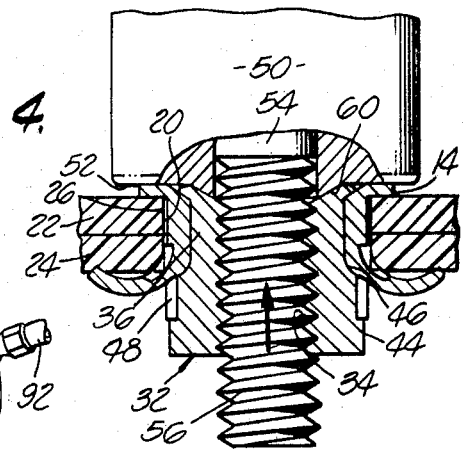
FIG. 4.
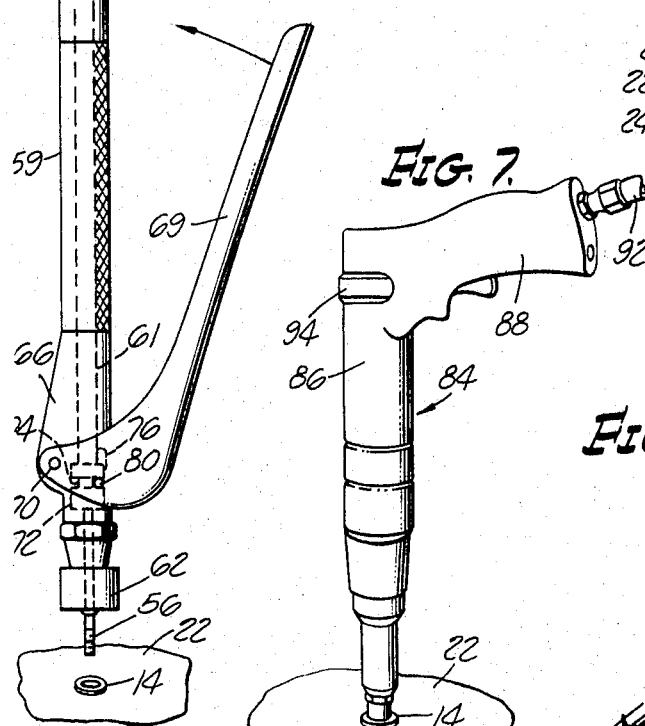
FIG. 6.
FIG. 7.
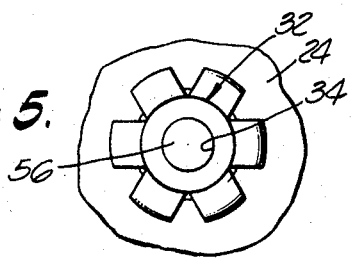
FIG. 5.
INVENTORS.
KENNETH V. CUSHMAN
DELMAR S. MILLER
BY
Hergig, Welsh & Blackham
ATTORNEYS United States Patent Office 3,465,637
Patented Sept. 9, 1969

3,465,637
FASTENER
Kenneth V. Cushman, Santa Ana, and Delmar S. Miller,
Newport Beach, Calif., assignors, by mesne assignments, to Rex Chainbelt Inc., Milwaukee, Wis., a corporation of Wisconsin
Filed Sept. 26, 1967, Ser. No. 670,711
Int. Cl. F16b 13/04, 33/04
U.S. Cl. 85—72     1 Claim

ABSTRACT OF THE DISCLOSURE

The device of the invention is a one piece threaded blind fastener, or grommet. Preferably, it is initially formed in one piece. It has a tubular body with a head, the fastener or grommet being insertable from one side of the prepared hole and being capable of being set from one side. The tubular body has a skirt and integrally attached to the end of the skirt is a nut part, the joint between the nut part and end of the skirt being frangible or rupturable. The nut part has a threaded bore so that by means of a pulling tool which is threaded into the nut part, it can be pulled up and telescoped into the tubular body part while the head is being held by an anvil.

The nut part is drawn up against the end of the skirt part of the tubular body which is made so that the skirt part bulges or collapses, with the annular shoulder on the nut part, then passing the end of the skirt part and moving into it so that the outwardly bulged part of the skirt part snaps over the annular shoulder of the nut part and holds it against movement in either direction.

Summary of the invention

The invention relates to a fastener and method of setting it. The fastener might also be referred to as a grommet which provides a tubular reinforcing body in a hole through a piece of material or laminated materials. In the exemplary form of the invention, it take the form of a threaded blind fastener.

The invention is particularly directed to a fastener or grommet of the type stated which is of minimum length and which from the standpoint of size, simplicity, and economy is adapted to the molded plastic industry. The invention is particularly adapted for use with fibrous materials such as fiber glass skins, molded plastic components, etc.

With respect to the prior art, there are presently known different types of blind fasteners which generally are of two piece construction. There are others that originally are one piece units that separate into two sections when installed. In general, these known fasteners are types wherein an expanded portion or area of metal is brought into direct contact with the underside of an attaching surface. The purpose generally is to resist tension loads.

Some of these known types of fasteners are adapted for dry wall or plaster wall fastening applications. The known types however are not adapted to the particular utilization of the herein invention for various reasons, including that they are much too long for use in restricted areas and too cumbersome and costly to be adapted to the molded plastic industry, and are otherwise not comparable.

A primary object of the herein invention is to provide and make available a fastener or grommet of minimum length that can be installed blind, that is capable of distributing tension loads over a large area and is simple to install and economical to manufacture. It is a particular object of the invention to provide and make available an improved one piece, blind, miniature fastener or grommet particularly adapted for use in fibrous materials or plastic molded components. Another object is to provide such fastener that can be installed from side only.

Further objects reside in providing a fastener of the type described that may be installed with unskilled labor using standard readily available tools. Another object is to insure positive retention of the fastener after assembly and prior to the reception of the threaded means such as the attaching screw, by way of a flare feature which is preferably provided in a one piece fastener. Another object is to provide means in the fastener which will prevent its rotation when an attaching screw is tightened.

It is another object of the invention to provide a fastener as described that is capable of distributing tension pull out loads over a wide area.

In a preferred form of the invention it is fabricated in the manner set forth in the foregoing abstract. That is, it is a one piece unit which separates into sections when installed. The fastener may be installed using a very simple installation tool. The tool is provided with a threaded mandrel which is threaded through the nut part of the fastener. This may be done before or after the fastener is inserted in the hole. The tool is provided with means for exerting sufficient axial pulling force to telescope the nut part into the tubular counter-bore of the fastener, these parts shearing at the thin joining section between them. The installation procedure is continuous. The end or skirt part of the tubular body becomes slit axially into leaves which are curled backwardly or upwardly by the annular camming shoulder on the nut part so that the leaves are pressed back against the underside of the material in which the fastener is being set to distribute the load. The nut moves upwardly in the tubular body until its end engages the taper on the installation tool so that the end of the nut is flared so as to nest into the tapered end bore in the tubular body. In one form of the invention the taper on the tool is omitted as is the flare on the nut.

Another object of the invention is to provide a fastener of the type described wherein the tubular part is constructed so that the nut part, upon the application of axial force thereto, can bulge or collapse the skirt outwardly and then move to a position within the bulged skirt part with the said bulged part snapping over the shoulder on the nut to engage it and hold it against axial movement in either direction.

Further objects and additional advantages of the invention will become apparent from the following detailed description and annexed drawings wherein:

FIGURE 1 is an external view of the one piece fastener before installation;

FIGURE 2 is a sectional view showing the fastener in a hole with an installation tool in position for installing;

FIGURE 3 is a view like that of FIGURE 2 showing the installation of the fastener in process;

FIGURE 4 is a view similar to FIGURES 2 and 3 showing the installation of the grommet when complete;

FIGURE 5 is a bottom view of the installed fastener;

FIGURE 6 is a view of one form of installing tool;

FIGURE 7 is a view of another form of installing tool;

Figure 8:
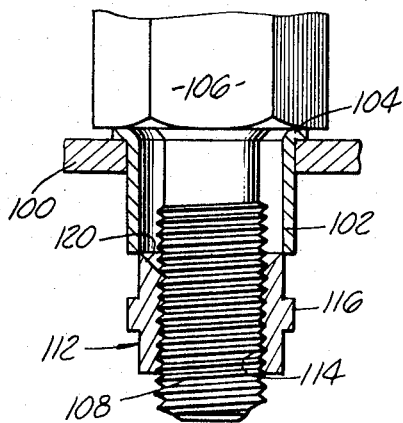
FIGURE 8 is a sectional view of a modified form of the invention and before setting of the fastener.

FIGURE 1 shows at 10 a preferred form of the fastener or grommet before installation. The fastener is shown in section in FIGURE 2 in connection with the installation procedure. Preferably it is formed in one piece. The upper part of the one piece unit is tubular as designated at 12 having a thin flat head 14 in the form of a flange. An intermediate part of the tubular body is of slightly smaller diameter as indicated at 16 there being a square shoulder 18 between the parts of different diameters. The section 12 of larger diameter is compatible to the size of the hole in which the fastener is being installed, this hole being indicated at 20. The axial extent of the part of larger diameter represents a percentage of the wall thickness in which the fastener is being installed particularly if it is being installed in thick wall sections of a soft fibrous nature such as designated at 22 and 24. Provided on this part of the tubular body or barrel are knurls as designated at 26 and these knurls function as an anti-rotation feature by way of their sharp edges at the crests of the knurls biting into the wall surface of the prepared hole in which the fastener is being installed, as will be described. The body part has a counter-bore 15 and a tapered end bore 17 for purposes which will be described presently.

The lower part of the tubular body of the fastener is tapered as shown at 30. The knurls 26 can be extended down into the tapered section if desired.

The one piece fastener includes a nut section 32 having a threaded bore 34. The upper part of the nut or nut section 32 is of smaller diameter as designated at 36. This diameter is the same as the internal diameter of the tubular part 16, i.e., counterbore 15. The nut 32 is joined to the end of the tapered skirt 30 of the tubular body or barrel by a thin wall section which is frangible or rupturable for ease of forming and simultaneous splitting of the skirt 30 into multiple retention leaves when pressure is applied to the nut 32 to draw it in axially into the bore of the tubular part of the fastener as will be described. The diameter is reduced at the end of the skirt or tapered part of the body as designated at 40 so that a thin wall section is formed between the end of the skirt and the end of the part of the nut 32 of smaller diameter. As stated, the reduced diameter 36 is held the same as the diameter of the counterbore 15. The axial length of the portion of reduced diameter designated at 36 is made slightly longer than the straight machined surface, part 12 of the fastener. This extra length protrudes or extends beyond the head surface of the unit and is flared upon contacting the anvil of the adapter at the time of setting the fastener as will be described. (This feature may, of course, be omitted.) Thus, the length of the portion having diameter 36 might be .010 inch longer by way of example. Also between the diameters 36 and 44 of the nut 32 is a rounded annular shoulder or radius 46 that acts as a forming anvil to curl back the split segments of metal of the skirt 30. The part of the nut 30 having diameter 44 also has a straight knurl with sharp corners at the upper ends as designated at 48 to induce splitting of the thin wall section of the skirt 30 upon contact therewith prior to completing the curling of the leaves as will be described. The nut 32 has a lower or bottom section that is not knurled. The counterbore 15 in the tubular fastener extends to the thin wall section 40 to within .003–.008 inch of breaking through to this area, by way of example.

At the end of the counterbore 15 as stated, there is a tapered bore 17 on a 30 degree angle. This area functions as a nest to receive the flaring material originally incorporated into the nut section as will be described. In a modified form of the invention, this taper is omitted.

Installation of the fastener or grommet is a continuous operation. It can be accomplished by means of a standard pull up tool or if both sides of the application are accessible a simple pressing device can be used. FIGURES 6 and 7 show types of installation tools which may be used. The tool of FIGURE 6 is a manually operable tool and that of FIGURE 7 is a pneumatically driven tool. In either case, an adapter is used, one end of which incorporates a 30 degree angle for the purpose of flaring the excess material on the nut section. In FIGURE 3 an end part of the tool is designated at 50 having a lower anvil surface 52. Extending from this part of the tool is a stem 54 which is threaded as shown at 56 for threading through the bore of the nut 32. Between the stem 50 and the extending part 54 is the tapered portion 60 which tapers at a 30 degree angle for flaring the excess material on the nut section as will be described. The standard pull up tool is modified to incorporate a flaring facility as described. In a modified form of the invention, the taper is not provided.

Referring to FIGURE 6, the tool has a cylindrical body 59 and rotatable within this body is the stem 61 on the end of which is the threaded mandrel 56 adjacent to the chuck 62 on the tool. The stem 61 is rotatable by knurled knob 54. The body of the tool has a laterally extending part 66 to which is pivoted an operating handle 69 the end of which is bifurcated and straddles the body of the tool being pivoted thereto on a pin 70. On the stem 61 is a collar 72 having an annular groove 74 in it. The bifurcated end of the handle 67 carries pin 80 which passes through slot 76 in body 61 and is engageable in groove 74. The mandrel 56 may be threaded into the fastener by means of the knob 64. Then by merely squeezing the handle 69 inwardly towards the body of the tool, an axial force is applied to the mandrel 56 sufficient in magnitude to install and set the fastener or grommet in the manner as will be described in detail hereinafter. After installation, the mandrel 56 is merely threaded out of the fastener.

FIGURE 7 shows another type of tool as designated at 84 which is of the pistol-grip type having a barrel or body 86 and a pistol-grip handle 88. The tool is pneumatically operated, the power connection being designated at 92 and within it is the threaded mandrel which is threaded into the fastener. This tool is of a known type embodying a torque clutch which will release at a set torque, the magnitude of which can be set by knob 94. The trigger has two positions. In a first position the mandrel is rotated to thread into the fastener. Then the mechanism of the tool is actuated to exert an axial pulling force in the correct amount to set the fastener. In the second position of the trigger, the mandrel is rotated in the opposite direction to unthread it from the installed fastener. As may be observed, the installation of the fasteners may be accomplished in a few seconds simply by threaded the fastener onto the tool, placing it in the hole, setting it and unthreading the tool.

Irrespective of the exact techniques used in the installation, the action in the installation of the fastener is as follows: The one piece integral fastener or grommet 10 is inserted through the hole from one side as described, the diameter of the portion 12 fitting in the hole 20. A tool as shown in FIGURE 6 or FIGURE 7 is applied to the fastener either before or after insertion in the hole. The stem 54 of the tool is threaded through the bore of the nut part 32, the anvil 52 of the tool coming down against the flange or head 14 of the fastener. The nut part 32 is now pulled upwardly. With a tool as shown in FIGURE 6, the handle 69 is merely closed against the barrel 60 and the leverage of the handle pulls upwardly on the stem 61 as described. The tool of FIGURE 7 is pneumatic as described and in this tool a power mechanism threads and unthreads the mandrel and pulls up, i.e., set the fastener.

The upward or axial force on the nut part 32 pulls the nut upwardly so that the thin annular section 40 shears, the nut separating from the tubular barrel part of the fastener. The nut telescopes into the skirt 30 of the tubular part of the fastener. This action is illustrated in FIGURE 3. The shoulder or radius 46 acts as a curling anvil and when it contacts the end wall section of the skirt of the tubular sleeve, a forming action begins. Further movement permits the now expanding metal to contact the sharp knurls 48. The knurls serve to split the tubular sleeve or skirt into multiple sections and causes them to curl outwardly as illustrated in FIGURES 4 and 5 until these leaves 30' make contact with the undersurface of the material 24 in which the fastener is being installed. The upward movement of the nut 32 is continuous, the shoulder or radius 46 coming up inside the hole in the material to which the fastener is being applied. This is illustrated in FIGURE 4. The radius or shoulder 46 comes up substantially to the square shoulder 18 on the tubular part of the fastener with the knurls 48 in a position as shown in FIGURE 4. The upper end of the nut 32 comes up into engagement with the flare 60 on the tool 50 so that its end is flared out to nest into the tapered bore 17 at the upper end of the fastener as illustrated in FIGURE 4. This same action expands the upper diameter 12 of the fastener forcing the straight knurls 26 into the side walls of the prepared hole 20 in the material thus providing an anti-rotation feature or characteristic in the installation.

The figures show an installation in which fibrous sheets 22 and 24 are secured together. The fastener may be of course, installed in a single sheet. In this case the shoulder 46 comes up substantially to the lower surface of the sheet. Thus a reinforcing grommet is provided with the additional facility, i.e., threads for making attachments.

Figure 9:
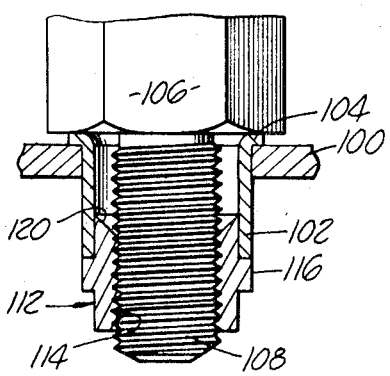
FIGURE 9 is a sectional view similar to FIGURE 8 showing the beginning of the setting or installation movement of the nut part of the fastener.
Figure 10:
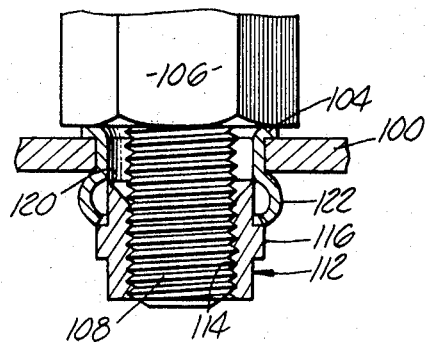
FIGURE 10 is a sectional view similar to FIGURES 8 and 9 showing further progression in the setting movement or operation.
Figure 11:
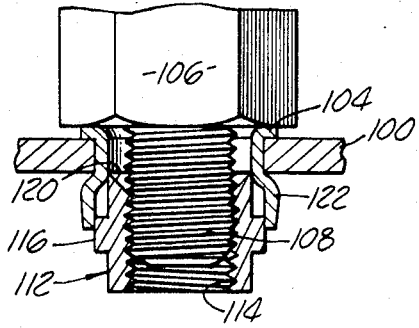
FIGURE 11 is a sectional view similar to that of FIGURES 8 and 9 and 10 showing further progression in the setting movement.
Figure 12:
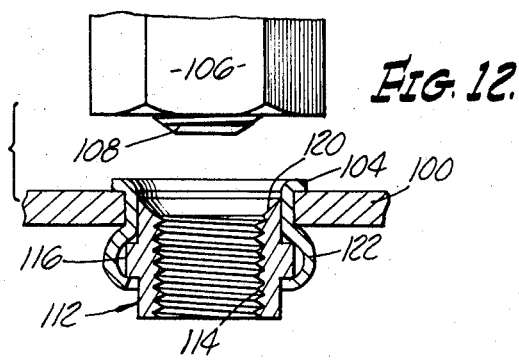
FIGURE 12 is a sectional view similar to that of FIGURES 8, 9, 10, and 11 showing the fastener fully set or installed.

Referring now to FIGURES 8 to 12 of the drawing, these figures show a modified form of the fastener adapted for installation or setting in material similar to that described in connection with the previous embodiment as designated at 100. The fastener comprises a cylindrical or tubular body 102 having an end flange 104. The end part of the setting tool is designated at 106. This tool is without the flare 60 and without the result occasioned by this flare. This tool may be used with the fastener of the previous embodiment. In FIGURES 8 to 12, the tool has a threaded stem 108. The nut part is designated at 112 being cylindrical, and having a threaded bore 114. It has an intermediate annular flange 116, preferably with square shoulders. In the end of the nut part 112 is an unthreaded tapered counterbore 120. The various figures show the progression as the nut part is drawn up towards, and in the skirt of the tubular part by the installation tool. It of course exerts axial force on the nut part 112 which force is upwardly in the figures shown. In FIGURE 9, the nut part 112 has been drawn up until its annular shoulder 116 has engagd the skirt end of the tubular fastener part 102. As further axial force is applied to the nut part 112, the end of the skirt part 102 collapses or bulges out forming an annular rib as shown at 120 in FIGURE 10 which is adjacent to the base or application material 100 as shown. Upon application of continued axial force, the annular flange or rib 116 slips past the end of the bulged part 120 of the skirt or, what hapens is that this bulged part of the skirt snaps over the annular rib 116, FIGURE 11 showing this part passing over the annular rib 116. After passing over it, it has a position as shown in FIGURE 12 which is the installed or set position of the fastener. The annular rib 120 is adjacent to the material 100 so that the fastener is securely held in the material and cannot be removed therefrom. The annular rib 116 on the nut part is held within the rib 120 and cannot move axially in either direction. That is, the threaded part of the fastener cannot be pulled out of the material in which the fastener has been installed.

From the foregoing, those skilled in the art will readily observe and understand the nature and construction of the fastener of the inveniton and the technique for installing it. Those skilled in the art will further readily understand the manner in which objects as set forth in the foregoing are realized and the manner in which the advantages are achieved as well as the many additional advantages that are apparent from the detailed description.

What is claimed is:

1. A fastener comprising a metallic tubular body part adapted to be inserted in an opening through a workpiece with one end projecting therefrom and having a transverse end surface at said one end; a second part adapted to be moved axially into said one end of said body part and having a cylindrical leading end of substantially the same diameter as the inside of said tubular part and a circumferential rib thereon defining a transverse shoulder axially facing said end surface whereby axial force applied to said second part in a direction toward said body part causes said transverse shoulder to engage and displace said end surface in an axial direction while causing the mid region of said projecting portion of said body part to bulge outwardly and form an annular hollow rib abutting the adjacent surface of said workpiece without substantial radial expansion of said one end and thereafter causes said one end to resiliently snap over said circumferential rib and lock said second part against withdrawal from said body part.

References Cited

UNITED STATES PATENTS

| 2,319,376 | 5/1943  | Wallace       | 85—75 |
| 2,365,834 | 12/1944 | Olmsted       | 85—74 |
| 2,409,352 | 10/1946 | Gill          | 85—75 |
| 2,435,876 | 2/1948  | De Swart      | 85—74 |
| 2,959,999 | 11/1960 | Wing          | 85—75 |
| 3,063,329 | 11/1962 | Vaughn        | 85—73 |
| 3,196,733 | 7/1965  | Cohen et al.  | 85—75 |
| 3,197,854 | 8/1965  | Rohe et al.   | 85—70 |
| 3,204,517 | 9/1965  | Looker        | 85—77 |
| 3,216,304 | 11/1965 | James et al.  | 85—72 |
| 3,279,303 | 10/1966 | Shackelford   | 85—75 |

FOREIGN PATENTS

| 245,773   | 3/1966  | Austria.      |
| 1,343,709 | 10/1963 | France.       |
| 1,435,652 | 3/1966  | France.       |
| 553,124   | 5/1943  | Great Britain. |
| 647,380   | 12/1950 | Great Britain. |
| 856,808   | 12/1960 | Great Britain. |

MARION PARSONS, JR., Primary Examiner

U.S. Cl. X.R.

85—74, 75, 77